US008945397B2

(12) United States Patent
Ge et al.

(10) Patent No.: US 8,945,397 B2

(45) Date of Patent: Feb. 3, 2015

(54) METHODS OF INHIBITING CYANOBACTERIA GROWTH BY ADMINISTERING GRAMINE DERIVATIVES

(71) Applicant: San Francisco State University, San Francisco, CA (US)

(72) Inventors: Yuhua Ge, Nanjing (CN); Zheng-Hui He, San Francisco, CA (US); Weiming Wu, Albany, CA (US)

(73) Assignee: Cyanotrol, LLC, San Francisco, CA (US)

( * ) Notice: Subject to any disclaimer, the term of this patent is extended or adjusted under 35 U.S.C. 154(b) by 335 days.

(21) Appl. No.: 13/656,105

(22) Filed: Oct. 19, 2012

(65) Prior Publication Data

US 2014/0110350 A1 Apr. 24, 2014

(51) Int. Cl.

*C02F 1/50* (2006.01)
*C02F 1/68* (2006.01)
*C02F 1/76* (2006.01)

(52) U.S. Cl.

CPC ... *C02F 1/50* (2013.01); *C02F 1/76* (2013.01); *C02F 1/68* (2013.01)

USPC .......................................... 210/755; 210/764

(58) Field of Classification Search

CPC ................ C02F 1/50; C02F 1/68; C02F 1/76; C02F 2103/007; C02F 2303/04

USPC ...................................... 210/747.6, 755, 764

See application file for complete search history.

(56) References Cited

U.S. PATENT DOCUMENTS

| | | | |
|---|---|---|---|
| 4,872,986 | A | 10/1989 | Stringfellow |
| 5,198,553 | A | 3/1993 | Kubler et al. |
| 5,342,547 | A | 8/1994 | Konya et al. |
| 6,395,866 | B1 | 5/2002 | Miyamoto et al. |
| 7,612,049 | B2 | 11/2009 | Kao |
| 7,989,393 | B2 | 8/2011 | Kang et al. |

OTHER PUBLICATIONS

Hong, et al. Effects of Allelochemical Gramine on Photosynthetic Pigments of Cyanobacterium, World Acad of Sci, Eng and Tech, 71:830-34. 2010.

(Continued)

*Primary Examiner* — Lucas Stelling

(57) ABSTRACT

This invention offers an effective method of inhibiting the growth of toxic bloom algae caused by cyanobacteria *Mycrocystis aeruginosa* in freshwater environments comprising administering an effective amount of 5,6-dichlorogramine to the freshwater. Also, the invention offers an effective method of inhibiting the growth of toxic bloom algae caused by *M. aeruginosa* comprising administering an effective amount of 5,6,7-trichlorogramine to the freshwater. Both compounds, 5,6-dichlorogramine and 5,6,7-trichlorogramine, may be administered individually or in combination to the freshwater. Both compounds are individually very potent and only need to be administered at a very low concentration to be effective at inhibiting the growth of *M. aeruginosa* in freshwater environments. Both 5,6-dichlorogramine and 5,6,7-trichlorogramine are each individually effective at inhibiting *M. aeruginosa* at low concentrations, between about 0.01 mg/L and about 0.05 mg/L, or more specifically at a concentration of about 0.03 mg/L. Also, both 5,6-dichlorogramine and 5,6,7-trichlorogramine individually have long potency durations, needing to be added no more frequently than once every 60 days to freshwater to inhibit the growth of *M. aeruginosa*.

21 Claims, 9 Drawing Sheets

(56) References Cited

OTHER PUBLICATIONS

Hong, et al. Effects of Allelochemical Gramine on Metabolic Activity and Ultrastructure of Cyanobacterium, World Acad of Sci, Eng and Tech, 71:825-29. 2010.

Li, et al. Synthesis, algal ihibition activities and QSAR studies of novel gramine compounds. Chinese Journal of Ocan & Limn, 27(2):309-16. 2009.

Kawamata, et al. 5,6-Dichloro-1-methylgramine, a non-toxic antifoulant derived from a marine natural product. Abstract. Prog Mol Subcell Biol., 42:125-39. 2006.

| Control (No added Gramine Compound) Algal growth | Compound No. 1 5-chlorogramine Algal growth | Compound No. 2 5-bromogramine Algal growth |
| --- | --- | --- |
| Compound No. 3 5-methoxygramine Algal growth | Compound No. 4 4-methylgramine Algal growth | Compound No. 5 5-cyanogramine Algal growth |
| Compound No. 6 6-methoxygramine Algal growth | Compound No. 7 6-benzyloxygramine Algal growth | Compound No. 8 4-benzyloxygramine Algal growth |
| Compound No. 9 5,6-dichlorogramine Algal growth | Compound No. 10 4-methoxygramine Algal growth | Compound No. 11 4-cyanogramine Algal growth |
| Compound No. 12 5,6,7-trichlorogramine Algal growth | | |

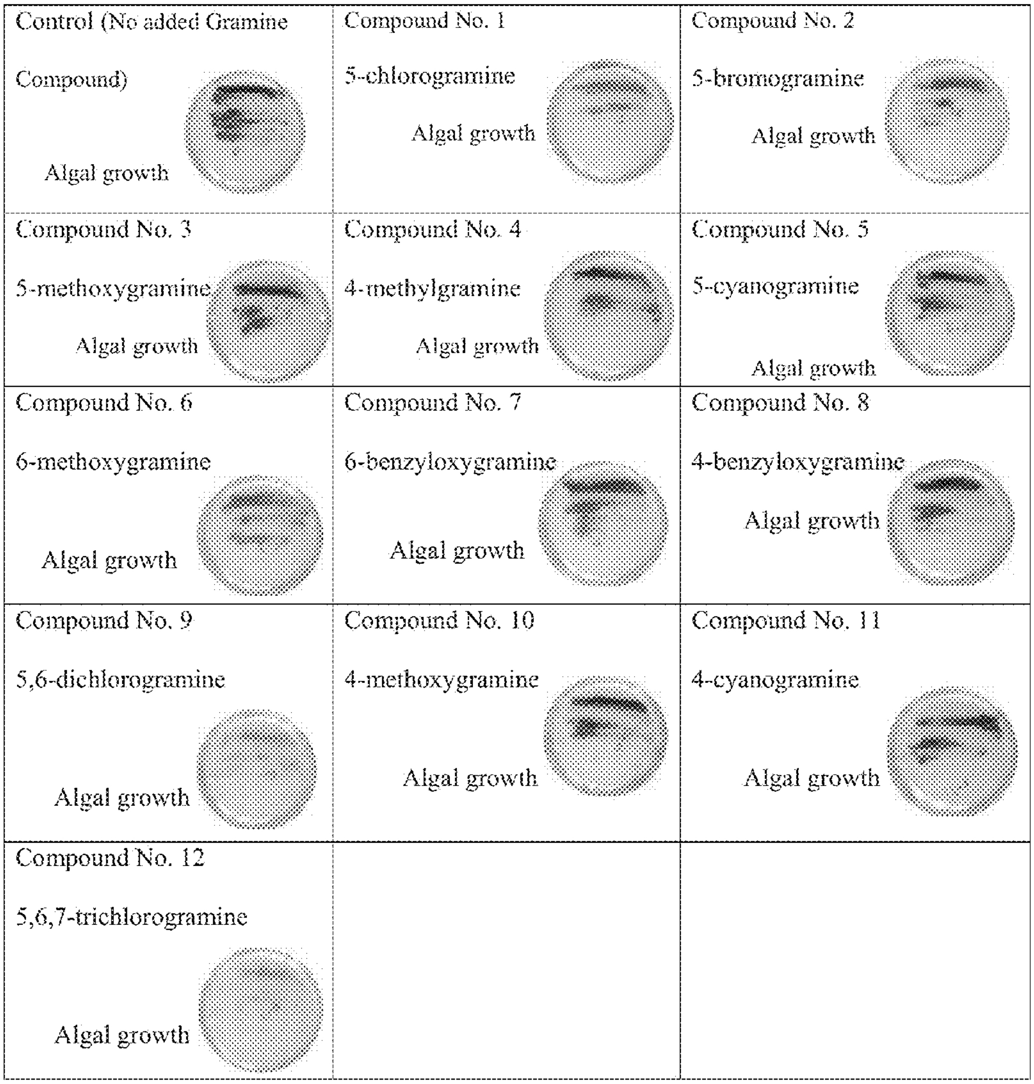

METHODS OF INHIBITING CYANOBACTERIA GROWTH BY ADMINISTERING GRAMINE DERIVATIVES

BACKGROUND OF THE INVENTION

1. Field of the Invention

This invention relates to methods of inhibiting growth of cyanobacteria bloom in freshwater environments by administering synthetic gramine compounds. The methods can be used to treat cyanobacteria in ponds, reservoirs, pools, tanks, lakes, and other fresh water environments.

Cyanobacteria, also known as blue green algae, can grow in freshwater environments and give the water a greenish and murky appearance. The large scale growth of cyanobacteria in freshwater is called algae bloom, which stresses freshwater environments. Algae blooms can decrease the dissolved oxygen level in the water, therefore stressing the fish and other marine organism populations. Moreover, algae blooms can produce significant amounts of natural toxins that poison the environment. Some cyanobacteria produce hepatotoxin or neurotoxin or both. These toxins irritate the skin and can lead to gastrointestinal inflammation if ingested. In many case, uncontrolled algae blooms kill the fish and other marine organism populations inhabiting the body of water.

There are many cyanobacteria species that will grow in freshwater and cause algae bloom. *Microcystis aeruginosa* is a cyanobacteria species which can form algae blooms and is the most common toxic cyanobacterial bloom in freshwater. *M. aeruginosa* can produce hepatotoxins and neurotoxins. Within the *M. aeruginosa* algae species, there are many different strains, that have been developed in isolation in different bodies of water. The different strains are quite biodiverse.

2. Description of the Related Art

Many methods have been devised to control algae growth in marine environments.

U.S. Pat. No. 4,342,547 teaches that many compounds, including a few gramine compounds, inhibit barnacle and algae attachment to watercraft surfaces. However, this patent does not teach how to inhibit toxic bloom algae growth.

U.S. Pat. No. 7,612,049 teaches that glucosamine can be used to inhibit the growth of *M. aeruginosa* cyanobacterium. The glucosamine should be added at a concentration of 10-50 ppm.

The 5,6-dichlorogramine compound has been shown to inhibit the growth of saltwater *N. closterium* algae, which is different from freshwater cyanobacteria. (Li, et al. Chinese Journal of Oceanology and Limnology, 27(2): 309-16. (2009).)

A naturally occurring gramine compound excreted from plants, N,N-dimethyl-3-amino-methylindole, has shown ability to inhibit the growth of *M. aeruginosa*. (Hong et al., World Academy of Science, Engineering and Technology, Vol 71: 825-29. (2010). Hong et al., World Academy of Science, Engineering and Technology, 71: 830-34. (2010).) However, according to the Hong articles, the concentration of the administered gramine compounds must be at least 8 mg/L to inhibit the growth of *M. aeruginosa*.

There is a continuing need to develop methods to control toxic algae bloom while being minimally invasive to the environment. Very potent compounds that are effective at inhibiting the growth of *M. aeruginosa* in low concentrations while being non-toxic to the environment would be an ideal solution to the problem of toxic algae bloom.

SUMMARY OF THE INVENTION

The present invention is directed to a method of inhibiting the growth of cyanobacteria *M. aeuruginosa* in fresh water comprising administering an effective amount of 5,6-dichlorogramine to the freshwater. The 5,6-dichlorogramine compound has this general formula:

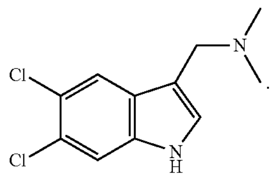

The present invention also is directed to a method of inhibiting the growth of cyanobacteria *M. aeuruginosa* in fresh water comprising administering an effective amount of 5,6,7-trichlorogramine to the freshwater. The 5,6,7-trichlorogramine compound has this general formula:

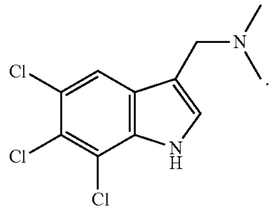

In one aspect of the invention, the effective amount for each of 5,6-dichlorogramine and 5,6,7-trichlorogramine individually may be between about 0.01 mg/L and about 0.05 mg/L in the freshwater. In another aspect of the invention, the effective amount for each of 5,6-dichlorogramine and 5,6,7-trichlorogramine individually may be about 0.03 mg/L in the freshwater. This concentration may be achieved by adding about 3 g of either 5,6-dichlorogramine or 5,6,7-trichlorogramine individually to about 100,000 L of freshwater. In another aspect of the invention, the desired effective amount of either 5,6-dichlorogramine and 5,6,7-trichlorogramine individually may be achieved by creating a solution having a concentration of about 1 g/L by dissolving about 3 g of either 5,6-dichlorogramine and 5,6,7-trichlorogramine individually in about 3 L of water, and adding the solution to about 100,000 L of freshwater.

In yet another aspect of the invention, both 5,6-dichlorogramine and 5,6,7-trichlorogramine individually have long lasting potency, and do not need to be individually administered more frequently than once every 60 days, or once every 90 days, or once every 120 days, or once every 180 days.

A method for inhibiting the growth of cyanobacteria *M. aeruginosa* in freshwater comprises creating a solution having a concentration of about 1 g/L by dissolving about 3 g of 5,6-dichlorogramine in about 3 L of water, and adding the solution to about 100,000 L of fresh water not more than once every 60 days. A method for inhibiting the growth of cyanobacteria *M. aeruginosa* in freshwater comprises creating a solution having a concentration of about 1 g/L by dissolving about 3 g of 5,6,7-trichlorogramine in about 3 L of water, and adding the solution to about 100,000 L of fresh water not more than once every 60 days.

In a final aspect of the invention, 5,6-dichlorogramine and 5,6,7-trichlorogramine can be administered in combination to the same freshwater body to inhibit the growth of *M. aeruginosa*.

BRIEF DESCRIPTION OF THE DRAWINGS

FIG. 2 is a table showing the effects of various gramine compounds on *M. Aeruginosa* growth as shown by photographs of petri dishes.

DETAILED DESCRIPTION OF THE INVENTION AND PREFERRED EMBODIMENTS

The present invention discusses utilizing two synthetic gramine compounds, 5,6-dichlorogramine and 5,6,7-trichlorogramine, to inhibit growth of toxic bloom algae caused by *Microcystis aeruginosa* in freshwater environments. The 5,6-dichlorogramine and 5,6,7-trichlorogramine may each act as an algaestatic agent to inhibit the growth of the algae.

Gramines are compounds that are naturally occurring in plants and may be synthetically created in laboratories. Gramines are compounds that have the following general structure:

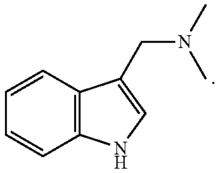

In some plants, gramines may be present as naturally occurring indole alkaloids that may play a defensive role by being toxic to many organisms. The 5,6-dichlorogramine compound is a synthetic compound that has this structure:

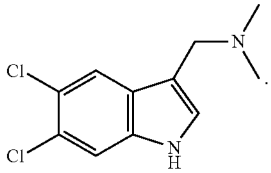

The 5,6,7-trichlorogramine compound is a synthetic compound that has this structure:

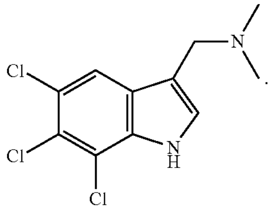

When 5,6-dichlorogramine is administered in an effective amount to freshwater environments containing toxic bloom algae caused by *M. aeruginosa*, the 5,6-dichlorogramine inhibits the growth of the toxic bloom algae. Likewise, when 5,6,7-trichlorogramine is administered in an effective amount to freshwater environments containing toxic bloom algae caused by *M. aeruginosa*, the 5,6,7-trichlorogramine inhibits the growth of the toxic bloom algae. The 5,6-dichlorogramine may be administered to freshwater environments in combination with 5,6,7-trichlorogramine to inhibit the growth of *M. aeruginosa*. Also, either compound may be combined with other compounds and solutions to inhibit *M. aeruginosa* toxic bloom algae in freshwater.

A. Definitions

The term "inhibit" as used herein means any of the following: reduce, slow, stop, obstruct, impede, and prevent.

The term "growth" as used herein means an organism's ability to divide and multiply cellularly and to reproduce itself.

The term "administer" as used herein means to place the synthetic gramine compounds into a partially or entirely closed environment so that the compounds will contact *M. aeruginosa* algae in that environment.

The term "effective amount" as used herein means an amount of compound administered to a body of freshwater containing *M. aeruginosa* algae which results in an objectively quantifiable reduction in volume of algae observed, measured or noted by one of ordinary skill in the art, when compared to a similar body of water without the presence of he administered compound.

The term "algaestatic" as used herein means inhibiting the growth of algae.

B. 5,6-Dichlogramine and 5,6,7-Trichlogramine Compound Synthesis

The 5,6-dichlorogramine and 5,6,7-trichlorogramine compounds are synthetic compounds that are part of the large gramine chemical family. Both 5,6-dichlorogramine and the 5,6,7-trichlorogramine are synthesized in a laboratory.

Figure 1A:
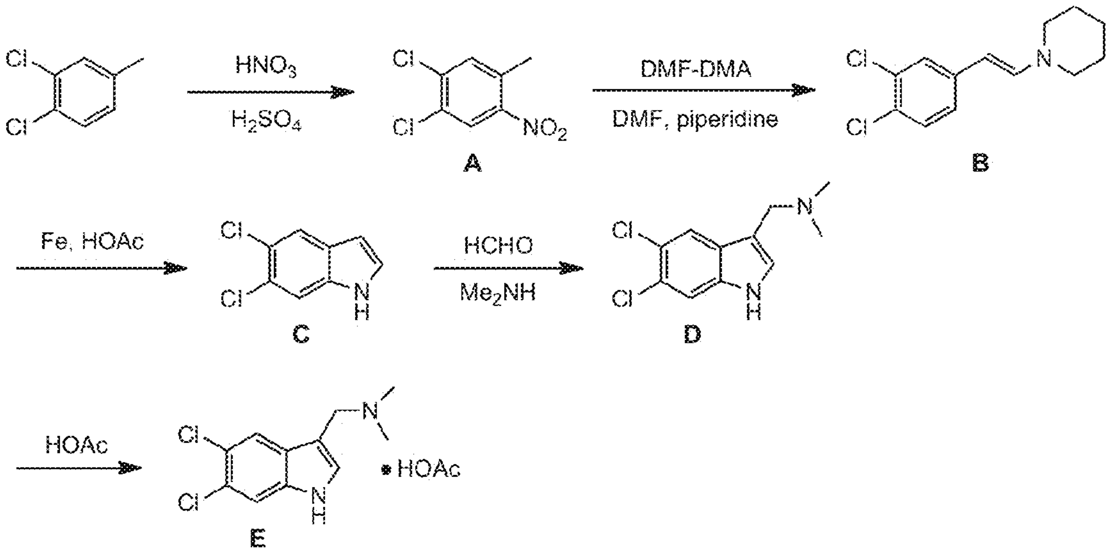
FIG. 1*a* shows a chemical synthesis process diagram for 5,6-dichlorogramine.

FIG. 1*a* shows the synthesis of 5,6-dichlorogramine. First, concentrated sulfuric acid is added to a reactor containing water. After the reactor is cooled to below 30° C., 3,4-dichlorotoluene is added into the reactor. The mixture is stirred and cooled and then nitric acid is added.

The reaction mixture is slowly added to a reactor containing cooled water. A solid crude 3,4-dichloro-6-nitrotoluene (A) precipitate is formed. The mixture is stirred and centrifuged. The crude 3,4-dichloro-6-nitrotoluene (A) is washed with water until neutral. Recrystallization in 60% ethanol produces pure product.

A solution of 3,4-Dichloro-6-nitrotoluene (A), N,N-Dimethylformamide dimethyl acetal (DMF-DMA), N,N-Dimethylformamide (DMF), and piperidine is mixed in a reactor and heated at 110-120° C. under nitrogen for 10 hours. The reaction mixture is concentrated under vacuum to one-third of the volume. Upon cooling, a solid precipitate is formed. The crude enamine (B) is concentrated by centrifugation, dried, and used directly in the next step without further purification.

Next, the crude enamine product (B) is mixed with 95% ethanol, water and glacial acetic acid in a reactor. The reactor is heated to 40° C. and then iron powder is added into it. The addition process is exothermic and the temperature is maintained at below 65° C. for 20 minutes. Upon completion of the exothermic process, the reactor is heated to reflux for an hour. The reaction mixture is then cooled to 40° C. and extracted with toluene, once with 400 L and twice with 300 L. The toluene solutions are combined, washed with 200 L water once, and concentrated to 180 L under reduced pressure. The 5,6-dichloroindole (C) forms as crystals and is concentrated and isolated by centrifugation.

Next, 37% aqueous formaldehyde solution and DMF are added into a reactor. The reactor is cooled to 0-5° C. and 33% aqueous dimethylamine solution then is added slowly with stirring. Concentrated sulfuric acid is added slowly to the mixture while the temperature is maintained at below 10° C. The mixture is stirred for an additional 15 minutes and cooled to 0-5° C. A solution of 5,6-dichloroindole (C) in DMF is added slowly to the reactor and stirred for an additional hour at 0-5° C. The mixture is allowed to warm to room temperature and stirred for 24 hrs. The mixture is then added to a reactor containing a solution of industrial sodium chloride in water. Activated carbon next is added and the mixture stirred for 30 minutes. Upon filtration, the filtrate is adjusted to pH>12 with 20% aqueous sodium hydroxide solution. The precipitate is filtered, washed with water until pH=7-8, centrifuged, and dried to yield crude 5,6-dichlorogramine (D). Recrystallization in 70% ethanol produces the pure product with melting point of 150-154° C.

5,6-dichlorogramine (D), glacial acetic acid, and toluene are mixed in a reactor. The mixture is stirred and heated to reflux for 2 hrs. Upon distillation of half of the toluene under reduced pressure, the reactor is allowed to cool. The solid formed is isolated by centrifugation, washed with cold toluene, and dried to yield the 5,6-dichlorogramine acetate salt (E).

Figure 1B:
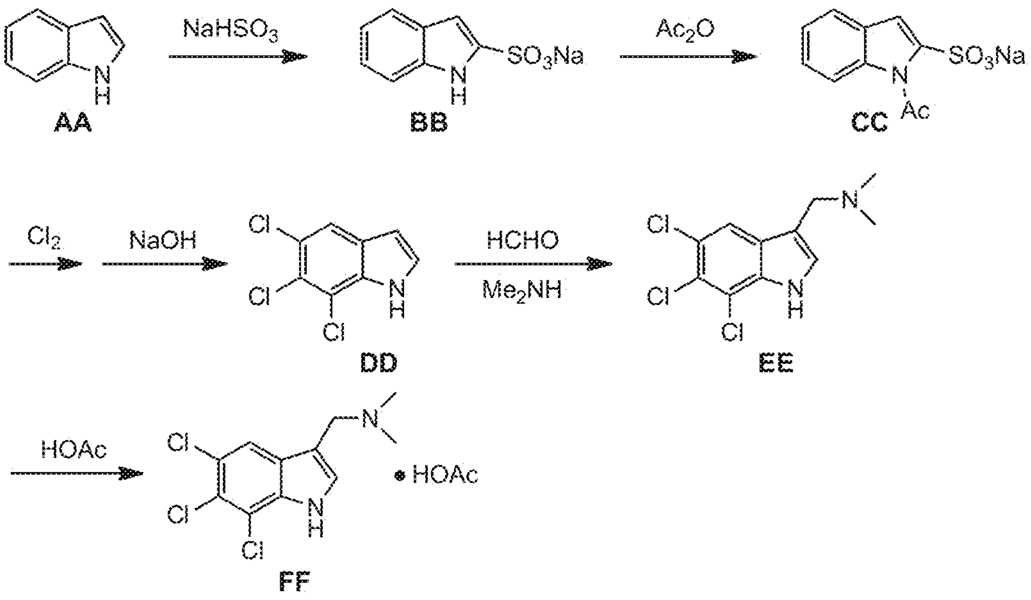
FIG. 1*b* shows a chemical synthesis process diagram for 5,6,7-trichlorogamine.

FIG. 1*b* shows the synthesis of 5,6,7-trichlorogramine. A solution of indole (AA) in ethanol is added to a solution of sodium bisulfite in water. The mixture is stirred at room temperature for 12 hrs. The solid precipitate is filtered, washed with ether, and dried to yield sodium indole-2-sulfonate (BB) as a white solid. The sodium indole-2-sulfonate product (BB) is used in the next step without further purification. MP>320° C.; IR (KBr, $cm^{-1}$) 3470, 3250, 1650, 1600, 1490, 1460, 1210, 1170, 1040, 760, 750.

To a round-bottom-flask containing acetic anhydride is added sodium bisulfite and sodium indole-2-sulfonate (BB). The mixture was heated and stirred at 70° C. for 1 hr and then at 90° C. for 2 hrs. Upon cooling, the solid is filtered, washed with ether, and dried to yield the acetylated sulfonate product (CC) as a white solid. The acetylated sulfonate (CC) was used in the next step without further purification. MP>320° C.; IR (KBr, $cm^{-1}$) 3480, 3010, 1660, 1490, 1400, 1385, 1150, 1050, 980, 760.

The acetylated sulfonate product (CC) is added to 350 mL water and the mixture is filtered. Chlorine gas is passed through the filtrate under stirring at 50° C. for 10.5 hrs and at reflux for 30 minutes. Nitrogen gas is passed through the reaction mixture to remove excess chlorine. The reaction mixture is neutralized with 20% sodium hydroxide solution and stirred for 12 hrs. Upon cooling, the mixture is filtered to yield a tan solid. The filtrate is adjusted to pH 12-13 with 20% sodium hydroxide solution. Upon cooling and filtration, an off-white solid is obtained. The solid is combined and recrystallized from ethanol/water to yield 5,6,7-trichloroindole (DD) as an off-white solid. MP 97.5-98° C.; IR (KBr, $cm^{-1}$) 3400, 1720, 1605, 1540, 1450, 1405, 1380, 1295, 1290, 1140, 1095, 850, 750, 705; $^{1}$H-NMR (300 MHz, DMSO-$d_6$) δ6.57 (s, 1H), 7.56 (s, 1H), 7.86 (s, 1H), 11.86 (s, 1H).

A mixture of 37% aqueous formaldehyde solution and DMF in a three-necked flask is cooled to 0-5° C. A 33% aqueous solution of dimethylamine is added. Then acetic acid is added. The reaction mixture is kept at 0-5° C. and a solution of 5,6,7-trichloroindole (DD) in DMF is added dropwise. The mixture is stirred at the same temperature at 1 hr and then at 40° C. for 24 hrs. The reaction mixture is poured to a solution of 5 g sodium chloride in 150 mL water, added activated carbon, and stirred. The filtrate is adjusted to pH>12. The solid is filtered and washed with water to neutral. Recrystallization in ethanol/water yields the 5,6,7-trichlorogramine product (EE) as a cream-colored solid. MP 151-153° C.; IR (KBr, $cm^{-1}$) 3100, 2980, 2760, 2340, 1610, 1550, 1460, 1410, 1295, 1240, 1160, 1100, 1000, 880, 840, 740; $^{1}$H-NMR (300 MHz, DMSO-d) δ2.12 (s, 6H), 3.50 (s, 2H), 7.43 (s, 1H), 7.84 (s, 1H), 11.70 (s, 1H).

5,6,7-trichlorogramine (EE), glacial acetic acid, and toluene are mixed in a round-bottom flask. The mixture is stirred and heated to reflux for 2 hrs. Upon removal of half of the toluene under reduced pressure, the mixture is allowed to cool. The solid formed is isolated by centrifugation, washed with cold toluene, and dried to yield the 5,6,7-trichlorogramine acetate salt (FF).

One of ordinary skill in the art, based on the synthesis description herein, can formulate the described 5,6-dichlorogramine and 5,6,7-trichlorogramine compounds using conventional synthetic chemistry techniques. The following specific examples, which describe the synthesis of several compounds of this invention, are to be construed as merely illustrative and not limiting of the disclosure in any way.

EXAMPLE 1

Synthesis of 5,6-Dichlorogramine 205 kg of concentrated sulfuric acid was added slowly to a reactor containing 12.7 L water. After the reactor was cooled to below 30° C., 40 kg of 3,4-dichlorotoluene was added to the sulfuric acid solution and stirred for about 2.5 hours while it was cooled to 5° C. Then 20 kg fuming nitric acid was added while the temperature was kept at 5° C. The mixture was stirred for an additional 30 minutes upon completion of the addition.

The reaction mixture was slowly added to a reactor containing 500 L of water that has been cooled to below 5° C. A solid precipitate was formed. The mixture was stirred for 30 minutes and then centrifuged. The crude 3,4-dichloro-6-nitrotoluene was washed with water until neutral. Recrystallization in 60% ethanol produced pure product.

60 kg of 3,4-dichloro-6-nitrotoluene was added to a solution of 600 kg N,N-dimethylformamide dimethyl acetal (DMF-DMA) in 240 kg dimethylformamide (DMF) and 3 kg piperidine in a reactor and heated at 115° C. under nitrogen for 10 hours. The reaction mixture was concentrated under vacuum to one-third of the volume. Upon cooling to 20° C., a solid precipitate of 1-piperidinyl-4',5'-dichloro-2'-nitrostyrene was formed. The crude 1-piperidinyl-4',5'-dichloro-2'-nitrostyrene product was separated by centrifugation, dried, and used directly in the next step without further purification.

56 kg of the crude 1-piperidinyl-4',5'-dichloro-2'-nitrostyrene product was mixed with 600 L of 95% ethanol, 300 L water and 30 kg glacial acetic acid in a reactor. The reactor was heated to 40° C. and 125 kg iron powder was added slowly. The temperature was maintained at below 65° C. for 20 minutes. Upon completion of the exothermic process, the reactor was heated to reflux for an hour. The reaction mixture was then cooled to 40° C. and extracted twice with toluene, once with 400 L and twice with 300 L. The toluene solutions were combined, washed with 200 L water once, and concentrated to 180 L under reduced pressure. The product 5,6-dichloroindole formed as crystals and was isolated by centrifugation.

19.6 kg of 37% aqueous formaldehyde solution and 16.3 kg of DMF were added to a reactor and then the reactor was cooled to 5° C. 33.3 kg of 33% aqueous dimethylamine solution was added. The reaction mixture was stirred for an additional hour at 0-5° C. upon completion of addition. 11.8 kg of concentrated sulfuric acid was added slowly to the mixture while the temperature was maintained below 10° C. The mixture was stirred for an additional 15 minutes and cooled to 5° C. A solution of 30 kg of 5,6-dichloroindole in 30 kg of DMF was added slowly to the reactor and stirred for an additional hour at 5° C. The mixture was allowed to warm to room temperature and stirred for 24 hrs. The mixture was then added to a reactor containing a solution of 50 kg industrial sodium chloride in 1600 L water. To this reactor was added 10 kg activated carbon and the mixture stirred for 30 minutes. Upon filtration, the filtrate was adjusted to pH>12 with 20% aqueous sodium hydroxide solution. The precipitate was filtered, washed with water until pH=7-8, centrifuged, and dried to yield crude 35 kg 5,6-dichlorogramine. Recrystallization in 70% ethanol produced the pure product with melting point of 150-154° C.

35 kg of 5,6-dichlorogramine, 8.8 kg of glacial acetic acid, and 80 kg of toluene were mixed in a reactor. The mixture was stirred and heated to reflux for 2 hrs. Upon distillation of half of the toluene under reduced pressure, the reactor was allowed to cool. The solid formed was isolated by centrifugation, washed with cold toluene, and dried to yield 38 kg of the 5,6-dichlorogramine acetate salt.

EXAMPLE 2

Synthesis of 5,6,7-Trichlorogramine

A solution of 5 g indole in 10 mL ethanol was added to a solution of 8.8 g sodium bisulfite in 30 mL water. The mixture was stirred at room temperature for 12 hrs. The solid precipitate was filtered, washed with ether, and dried to yield sodium indole-2-sulfonate (7.8 g, 91%) as a white solid. The product was used in the next step without further purification. MP>320° C.; IR (KBr, cm$^{-1}$) 3470, 3250, 1650, 1600, 1490, 1460, 1210, 1170, 1040, 760, 750.

To a round-bottom-flask containing 60 mL acetic anhydride was added 5 g sodium bisulfite and 5 g sodium indole-2-sulfonate. The mixture was heated and stirred at 70° C. for 1 hr and then at 90° C. for 2 hrs. Upon cooling, the solid was filtered, washed with ether, and dried to yield 5.7 g of sodium 1-acetylindole-2-sulfonate product (93%) as a white solid. The sodium 1-acetylindole-2-sulfonate product was used in the next step without further purification. MP>320° C.; IR (KBr, cm$^{-1}$) 3480, 3010, 1660, 1490, 1400, 1385, 1150, 1050, 980, 760.

3 g of sodium 1-acetylindole-2-sulfonate product was added to 350 mL water and the mixture was filtered. Chlorine gas was passed through the filtrate under stirring at 50° C. for 10.5 hrs and at reflux for 30 minutes. Nitrogen gas was passed through the reaction mixture to remove excess chlorine. The reaction mixture was neutralized with 20% sodium hydroxide solution and stirred for 12 hrs. Upon cooling, the mixture was filtered to yield about 1.5 g of tan solid. The filtrate was adjusted to pH 12-13 with 20% sodium hydroxide solution. Upon cooling and filtration, a 0.5 g off-white solid was obtained. The solid was combined and recrystallized from ethanol/water to yield product 5,6,7-trichloroindole (1.8 g, 67%) as an off-white solid. MP 97.5-98° C.; IR (KBr, cn$^{-1}$) 3400, 1720, 1605, 1540, 1450, 1405, 1380, 1295, 1290, 1140, 1095, 850, 750, 705; $^{1}$H-NMR (300 MHz, DMSO-d$_6$) δ6.57 (s, 1H), 7.56 (s, 1H), 7.86 (s, 1H), 11.86 (s, 1H).

5.7 g of 37% aqueous formaldehyde solution was mixed with 4.4 mL of DMF in a three-necked flask and then cooled to 5° C. 19.5 g of 33% aqueous dimethylamine was added dropwise and the mixture was stirred at 5° C. for 1 hr. 1 g of acetic acid was added dropwise while the temperature was maintained below 10° C. and the mixture stirred for 15 minutes. The reaction mixture was kept at 5° C. and a solution of 11 g of 5,6,7-trichloroindole in 8.8 g DMF was added dropwise. The mixture was stirred at the same temperature at 1 hr and then at 40° C. for 24 hrs. The reaction mixture, along with 10 g of activated carbon, were poured into a solution of 5 g sodium chloride in 150 mL water and stirred for 30 minutes. The filtrate was adjusted to pH>12. The solid was filtered and washed with water to neutral. Recrystallization in ethanol/water yielded 11 g of the product 5,6,7-trichlorogramine (87%) as a cream-colored solid. MP 151-153° C.; IR (KBr, cm$^{-1}$) 3100, 2980, 2760, 2340, 1610, 1550, 1460, 1410, 1295, 1240, 1160, 1100, 1000, 880, 840, 740; $^{1}$H-NMR (300 MHz, DMSO-d$_6$) δ2.12 (s, 6H), 3.50 (s, 2H), 7.43 (s, 1H), 7.84 (s, 1H), 11.70 (s, 1H).

8.3 g of 5,6,7-trichlorogramine, 1.8 g of glacial acetic acid, and 20 mL of toluene were mixed in a round-bottom flask. The mixture was stirred and heated to reflux for 2 hrs. Upon removal of half of the toluene under reduced pressure, the mixture was allowed to cool. The solid formed was isolated by centrifugation, washed with cold toluene, and dried to yield 8.6 g of the 5,6,7-trichlorogramine acetate salt.

C. 5,6-Dichlorogramine and 5,6,7 Trichlorogramine Compounds Identified As *M. Aeruginosa* Growth Inhibitors The 5,6-dichlorogramine compound and the 5,6,7-trichlorogramine compounds were screened along with ten other gramine compounds for effectiveness in inhibiting the growth of *M. aeruginosa* toxic algae bloom. Table 1 shows all twelve gramine compounds screened. The goal was to screen a collection of hydrocarbon-rich small organic molecules based upon simple scaffolds that could be easily synthesized.

TABLE 1

Gramine Compounds Screened for Effectiveness as *M. Aeruginosa* Growth Inhibitors

| Compound No. | Compound Name | Compound Structure |
|---|---|---|
| 1 | 5-chlorogramine | 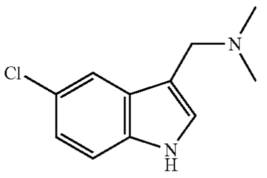 |
| 2 | 5-bromogramine | 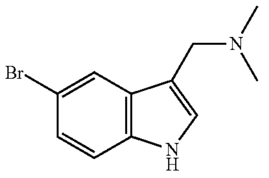 |
| 3 | 5-methoxygramine | 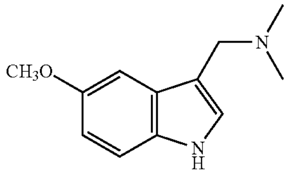 |
| 4 | 4-methylgramine | 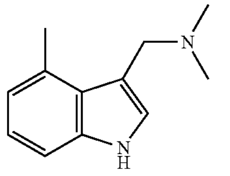 |
| 5 | 5-cyanogramine | 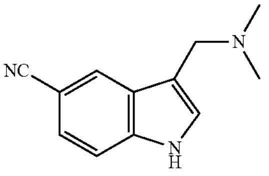 |
| 6 | 6-methoxygramine | 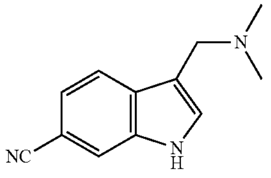 |
| 7 | 6-benzyloxygramine | 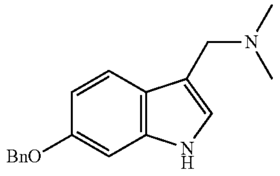 [SMILES: CN(C)Cc1c[nH]c2cc(OCc3ccccc3)ccc12] |

TABLE 1-continued

Gramine Compounds Screened for Effectiveness as *M. Aeruginosa* Growth Inhibitors

| Compound No. | Compound Name | Compound Structure |
|---|---|---|
| 8 | 4-benzyloxygramine | 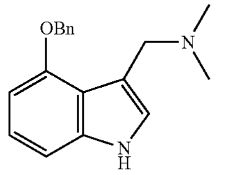 |
| 9 | 5,6-dichlorogramine | 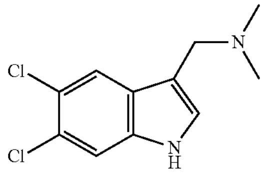 |
| 10 | 4-methoxygramine | 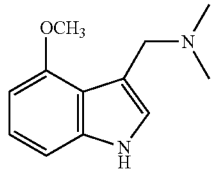 |
| 11 | 4-cyanogramine | 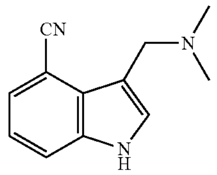 |
| 12 | 5,6,7-trichlorogramine | 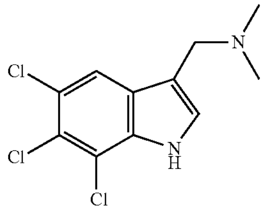 [SMILES: CN(C)Cc1c[nH]c2c(Cl)c(Cl)c(Cl)cc12] |

The screen tested the compounds on *M. aeruginosa* cyanobacteria, isolate strain 2667 from Culture Collection of Algae (CCA) at the University of Texas at Austin. For the initial screening test, the twelve compounds were each administered at different concentrations of: 0.5 mg/L, 1.0 mg/L, 2.0 mg/L, 4.0 mg/L, and 8.0 mg/L. The compounds were added to a freshwater culture medium (BG-11 Medium from the CCA, UTEX) in petri dishes. The petri dish plates were then incubated at about 22° C. in a lighted growth chamber with about 16-hr light and about 8-hr dark. *M. aeruginosa* algae growth in the petri dishes were examined and documented after 15 days of incubation.

FIG. 2 shows the *M. aeruginosa* cell growth in petri dishes containing medium that contained about 0.5 mg/L of the indicated compound. *M. aeruginosa* cells were streaked out on BG-11 medium that contained about 0.5 mg/L of the indicated compound. According to FIG. 2, the control petri dishes showed healthy *M. aeruginosa* growth after 15 days. The petri dishes streaked with 5,6-dichlorogramine (Compound No. 9) showed no *M. aeruginosa* growth after 15 days. The faint algae smears for petri dishes streaked with 5,6- dichlogramine show the original algae cells that had died in the petri dish. Also, petri dishes streaked with 5,6,7-trichlorogramine (Compound No. 12) showed no showed no *M. aeruginosa* growth after 15 days. The faint algae smears for petri dishes streaked with 5,6,7-trichlogramine show the original algae cells that had died in the petri dish.

As shown in FIG. 2, only Compound Nos. 9 and 12 inhibited *M. aeruginosa* growth completely during those 15 days. The petri dishes streaked with other gramine compounds showed significant amounts of *M. aeruginosa* growth.

To quantitatively measure *M. Aeruginosa* cell growth in responding to various gamine compounds, cell densities were determined by an optical absorption assay as measured by a spectrophotometer (Nanodrop 2000, Thermo Scientific). In the optical absorption assay, the absorbance of radiation (light) is measured as a function of frequency (wavelength). For this optical absorption assay, the algal cell density was determined at 600 nm wavelength. Equal amount of starting cells (optical density at wavelength 600 nm, $OD_{600}$, was at 0.100 on Day 0) were placed in freshwater culture for 15 days of growth. After 15 days, the algae cell suspension is pipetted into a cuvette and placed within the spectrophotometer for the optical absorption assay.

Table 2 shows *M. Aeruginosa* cell densities as measured at optical density at wavelength 600 nm, $OD_{600}$ after 15 days of growth. The same data is depicted in the graph shown in FIG. 3. As shown in Table 2 and FIG. 3, 5,6-dichlogramine (Compound No. 9) and 5,6,7-trichlorogramine (Compound No. 12) significantly inhibit the growth of *M. Aeruginosa* algae. There is a clear and distinct decrease in *M. Aeruginosa* algae growth when administered with 5,6-dichlogramine (Compound No. 9) and with 5,6,7-trichlorogramine (Compound No. 12) compared to *M. Aeruginosa* algae growth in control samples.

TABLE 2

Liquid culture assay to test effects of gramine compounds on *M. Aeruginosa* growth

| Compound No. | Compound Name (0.5 mg/L) | $OD_{600}$ Measured at Day 15 (Starting $OD_{600}$ at Day 0 is 0.100) |
|---|---|---|
| control | No compound added | 2.83 |
| 1 | 5-chlorogramine | 1.89 |
| 2 | 5-bromogramine | 1.95 |
| 3 | 5-methoxygramine | 2.45 |
| 4 | 4-methylgramine | 2.49 |
| 5 | 5-cyanogramine | 2.32 |
| 6 | 6-methoxygramine | 2.03 |
| 7 | 6-benzyloxygramine | 2.12 |
| 8 | 4-benzyloxygramine | 2.54 |
| 9 | 5,6-dichlorogramine | 0.131 |
| 10 | 4-methoxygramine | 2.66 |
| 11 | 4-cyanogramine | 2.50 |
| 12 | 5,6,7-trichlorogramine | 0.185 |

Figure 3:
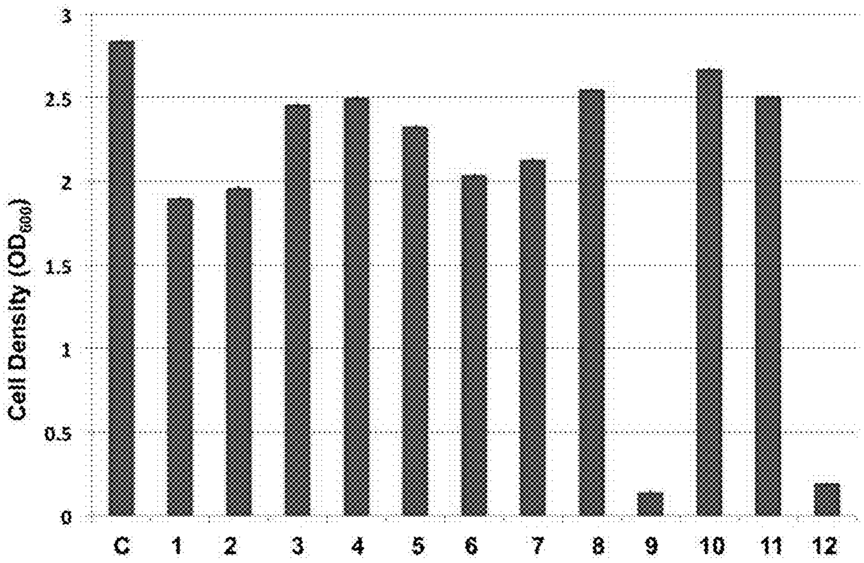
FIG. 3 is a chart showing gramine compound inhibition of *M. Aeruginosa* growth as measured by an optical absorption assay.

According to the data shown in Table 2 and charted in FIG. 3, 5,6-dichlorogramine (Compound No. 9) and 5,6,7-trichlorogramine (Compound No. 12) were much more effective at inhibiting the growth of *M. aeruginosa* after 15 days than any of the other ten gramine compounds tested. The optical density measurement ($OD_{600}$) for the control sample (no gramine compound added) reached as high as 2.8, whereas the optical density measurement ($OD_{600}$) reading for 5,6-dichlorogramine (Compound No. 9) was about 0.13, and the measurement for 5,6,7-trichlorogramine (Compound No. 12) was about 0.185. Other compounds such as Compound Nos. 1, 2, 6, and 7 also exhibited some inhibitory effects, but these exhibited effects were far less than for those of either 5,6-dichlorogramine (Compound No. 9) or 5,6,7-trichlorogramine (Compound No. 12). Compound No. 1 showed the next most effective inhibition of *M. aeruginosa* growth, showing an $OD_{600}$ measurement of 1.89, more than ten times higher than for either 5,6-dichlorogramine (Compound No. 9) or 5,6,7-trichlorogramine (Compound No. 12).

C. 5,6-Dichlorogramine and 5,6,7-Trichlorogramine Are Very Potent *M. Aeruginosa* Growth Inhibitors Since 5,6-dichlorogramine and 5,6,7-trichlorogramine compounds are potent inhibitors of *M. aeruginosa* growth, this invention contemplates using these compounds to inhibit *M. aeruginosa* toxic bloom algae growth in various freshwater environments. The data show that 5,6-dichlorogramine and 5,6,7-trichlorogramine compounds are potent at low concentrations.

Figure 4:
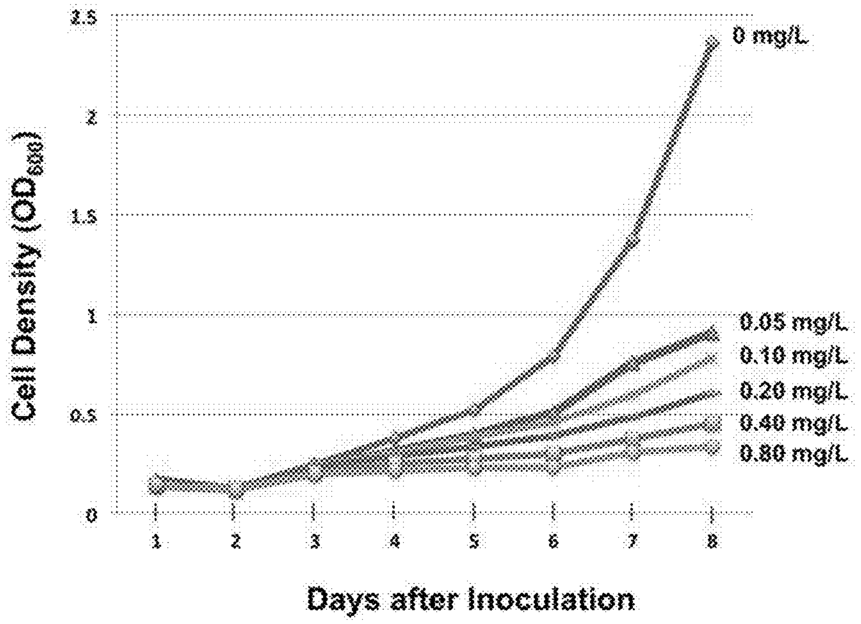
FIG. 4 shows the effects of various concentrations of 5,6-dichlorogramine on *M. Aeruginosa* growth as measured by an optical absorption assay.

FIG. 4 shows a graph illustrating the inhibitory effect varying concentrations of 5,6-dichlorogramine have on *M. aeruginosa* cell growth as shown by an optical absorption assay. All cultures at day 0 showed an $OD_{600}$ measurement of 0.1. Different concentrations of 5,6-dichlorogramine were administered to *M. aeruginosa* cells as indicated. *M. aeruginosa* cell density measurements were taken every 24 hours. As shown in FIG. 4, low concentrations of 5,6-dichlorogramine drastically reduce the volume of *M. aeruginosa* in freshwater medium after 8 days. During the first 3 days, the *M. aeruginosa* cell densities for the control sample and the 5,6-dichlorogramine samples were similar. But starting on day 4, there was larger differentiation in *M. aeruginosa* cell densities between the control samples and the 5,6-dichlorogramine administered samples. The control sample of *M. aeruginosa* had a high cell density after 8 days, measuring about 2.4 $OD_{600}$. In contrast, the $OD_{600}$ of *M. aeruginosa* after 8 days of exposure to 0.05 mg/L 5,6-dichlorogramine was about 0.9, only about 38% of the corresponding $OD_{600}$ measurement of the control sample. The $OD_{600}$ measurement for *M. aeruginosa* after 8 days of exposure to about 0.2 mg/L 5,6-dichlorogramine was about 0.6, only about 25% of the corresponding $OD_{600}$ measurement of the control sample. The $OD_{600}$ measurement for *M. aeruginosa* after 8 days of exposure to about 0.8 mg/L 5,6-dichlorogramine was about 0.3, only about 13% of the corresponding $OD_{600}$ measurement of the control sample.

Figure 5:
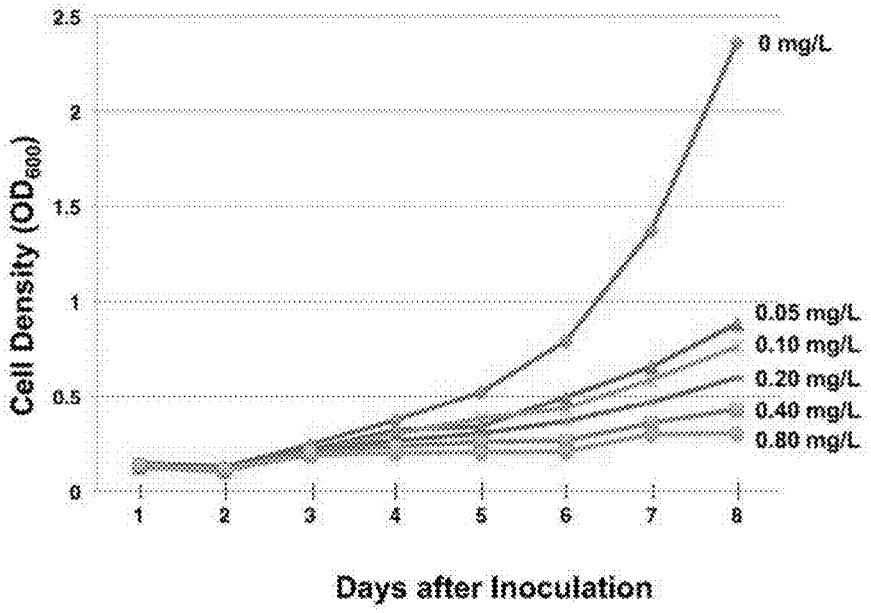
FIG. 5 shows the effects of various concentrations of 5,6,7-trichlorogramine on *M. Aeruginosa* growth as measured by an optical absorption assay.

FIG. 5 shows a graph illustrating the inhibitory effect varying concentrations of 5,6,7-trichlorogramine have on *M. aeruginosa* cell growth as shown by an optical absorption assay. All cultures at day 0 showed an $OD_{600}$ measurement of 0.1. Different concentrations of 5,6,7-trichlorogramine were administered to *M. aeruginosa* cells as indicated. *M. aeruginosa* cell density measurements were taken every 24 hours. As shown in FIG. 5, low concentrations of 5,6,7-trichlorogramine drastically reduce the volume of *M. aeruginosa* in freshwater medium after 8 days. As shown in FIG. 5, low concentrations of 5,6,7-trichlorogramine drastically reduce the volume of *M. aeruginosa* in freshwater medium after 8 days. During the first 3 days, the *M. aeruginosa* cell densities for the control sample and the 5,6,7-trichlorogramine samples were similar. But starting on day 4, there was larger differentiation in *M. aeruginosa* cell densities between the control samples and the 5,6,7-trichlorogramine administered samples. The control sample of *M. aeruginosa* had a high cell density after 8 days, measuring about 2.4 $OD_{600}$. In contrast, the $OD_{600}$ of *M. aeruginosa* after 8 days of exposure to 0.05 mg/L 5,6,7-trichlorogramine was about 0.9, only about 38% of the corresponding $OD_{600}$ measurement of the control sample. The $OD_{600}$ measurement for *M. aeruginosa* after 8 days of exposure to about 0.2 mg/L 5,6,7-trichlorogramine was about 0.6, only about 25% of the corresponding $OD_{600}$ measurement of the control sample. The $OD_{600}$ measurement for *M. aeruginosa* after 8 days of exposure to about 0.8 mg/L 5,6,7-trichlorogramine was about 0.3, only about 13% of the corresponding $OD_{600}$ measurement of the control sample.

Figure 6:
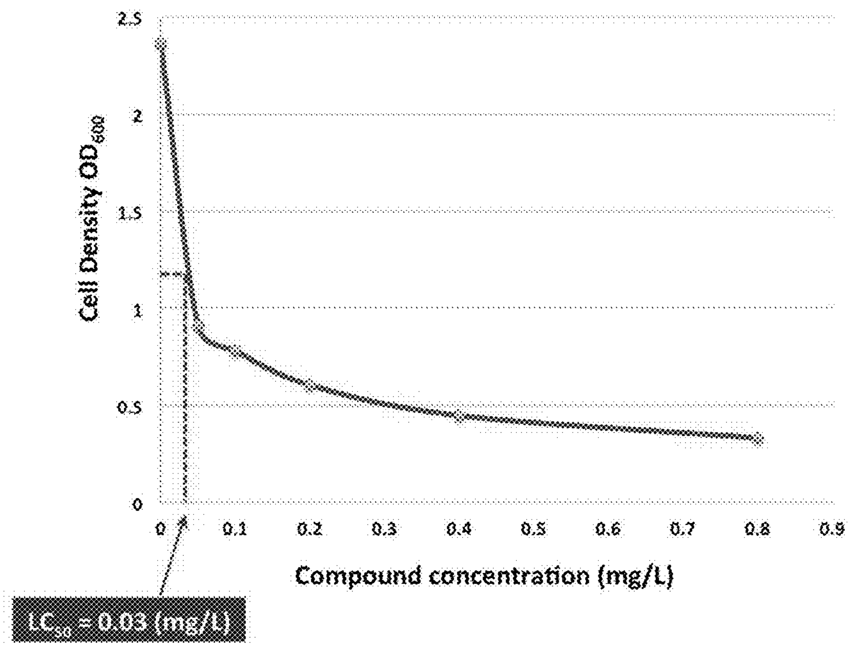
FIG. 6 shows a chart depicting the Lethal Concentration 50 threshold of 5,6-dichlorogramine.

FIG. 6 shows a graph depicting the Lethal Concentration 50 (LC50) calculation for 5,6-dichlorogramine taken from data depicted in FIG. 4. LC50 is a common way to describe the median lethal concentration of an administered agent in a medium, such as air or water, needed to kill half of the organism population living within the medium. LC50 is a well-known method of describing the acute toxicity of an administered agent on the target organism population.

FIG. 6 shows the calculated LC50 concentration for 5,6-dichlorogramine concentration after 8 days of *M. aeruginosa* growth. In FIG. 6, the optical density measurement ($OD_{600}$) of the *M. aeruginosa* cells on day 8 was plotted against the administered 5,6-dichlorogramine concentration. The control sample of *M. aeruginosa*, exposed to 0 mg/L of 5,6-dichlorogramine resulted in a day 8 optical density measurement of about 2.4 ($OD_{600}$). Half of about 2.4 is about 1.2, and according to FIG. 6, the 1.2 optical density measurement corresponds to an approximately 0.03 mg/L 5,6-dichlorogramine concentration. Based on these calculations, the effective amount of 5,6-dichlorogramine to administer to control the growth and spread of *M. aeruginosa* algae in fresh water may be a 5,6-dichlorogramine concentration ranging between about 0.01 mg/L and about 0.05 mg/L, and may be more specifically about 0.03 mg/L.

The concentration of the 5,6-dichlorogramine may be measured by the amount of the compound dissolved in the total volume of the freshwater environment. For a freshwater pond with dimensions of 10 m×10 m×2 m (200,000 L of water), administration of about 6 g of 5,6-dichlorogramine is needed to achieve a concentration of 0.03 mg/L. Another way to achieve this concentration is to dissolve about 6 g of 5,6-dichlorogramine into about 200,000 L of water. Alternatively, to achieve a concentration of about 0.03 mg/L in about 200,000 L of water, a solution may be created comprising about 6 g of 5,6-dichlorogramine dissolved in about 6 L of water, and the entire solution added to about 200,000 L of water.

Figure 7:
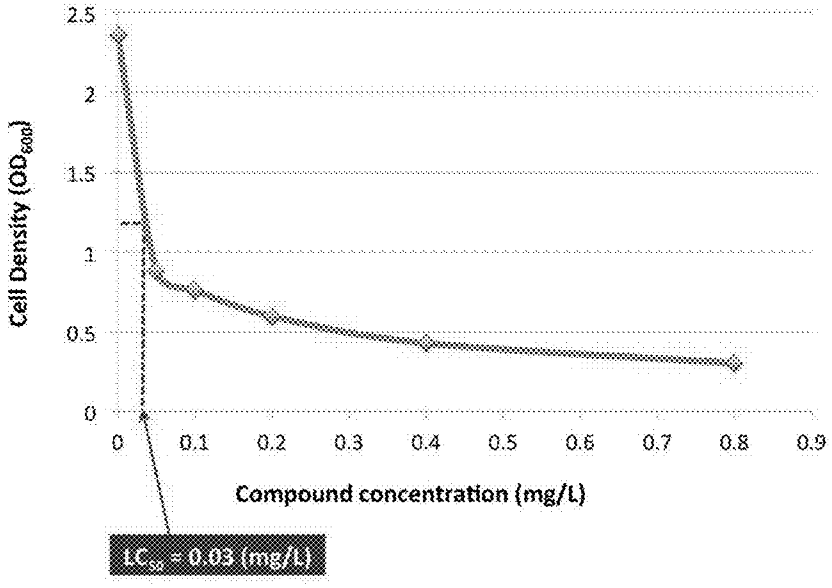
FIG. 7 shows a chart depicting the Lethal Concentration 50 threshold of 5,6,7-trichlorogramine.

FIG. 7 shows the calculated LC50 concentration for 5,6,7-trichlorogramine concentration after 8 days of *M. aeruginosa* growth. In FIG. 7, the optical density measurement (ODo) of the *M. aeruginosa* cells on day 8 was plotted against the administered 5,6,7-trichlorogramine concentration. The control sample of *M. aeruginosa*, exposed to 0 mg/L of 5,6,7-trichlorogramine resulted in a day 8 optical density measurement of about 2.4 ($OD_{600}$). Half of about 2.4 is about 1.2, and according to FIG. 7, the 1.2 optical density measurement corresponds to an approximately 0.03 mg/L 5,6,7-trichlorogramine concentration. Based on these calculations, the effective amount of 5,6,7-trichlorogramine to administer to control the growth and spread of *M. aeruginosa* algae in fresh water may be a 5,6,7-trichlorogramine concentration ranging between about 0.01 mg/L and about 0.05 mg/L, and may be more specifically about 0.03 mg/L.

The concentration of the 5,6,7-trichlorogramine may be measured by the amount of the compound dissolved in the total volume of the freshwater environment. Likewise, for a freshwater pond with dimensions of 10 m×10 m×2 m (200,000 L of water), administration of about 6 g of 5,6,7-trichlorogramine is needed to achieve a concentration of 0.03 mg/L. Another way to achieve this concentration is to dissolve about 6 g of 5,6,7-trichlorogramine into about 200,000 L of water. Alternatively, to achieve a concentration of about 0.03 mg/L in about 200,000 L of water, a solution may be created comprising about 6 g of 5,6-dichlorogramine dissolved in about 6 L of water, and the entire solution added to about 200,000 L of water.

The 5,6,-dichlorogramine and 5,6,7-trichlorogramine compounds can be added as solids directly to the freshwater containing the *M. aeruginosa*, or the compound solids can be first dissolved in a small volume of freshwater and added to the freshwater containing the *M. aeruginosa*. In one embodiment of the invention, stock concentrations of each compound can be made by adding about 3 g solids of each of 5,6,-dichlorogramine and 5,6,7-trichlorogramine compounds into about 3 L of water, forming about 1 g/L 5,6,-dichlorogramine, and about 1 g/L 5,6,7-trichlorogramine. The stock solutions can then be added to the freshwater containing the *M. aeruginosa* in a volume calculated to result in about 0.03 mg/L of each compound within the overall freshwater environment.

Both 5,6-dichlorogramine and 5,6,7-trichlorogramine are not only potent *M. aeruginosa* growth inhibitors, but they are effective inhibitors for a long period of time. In an experiment to test the effective potency duration of the compound, an equal amount of *M. aeruginosa* was grown in each of two containers, each containing about 1 L of fresh water from an urban sink tap. One container was administered with about 0.05 mg/L of 5,6-dichlorogramine, and the control container was not administered with any compounds. After 15 days of *M. aeruginosa* growth, the $OD_{600}$ measurement for the unadministered *M. aeruginosa* freshwater sample was 0.119. The unadministered *M. aeruginosa* freshwater sample was discarded after 15 days. In contrast, after 15 days of *M. aeruginosa* growth, the $OD_{600}$ measurement for the 5,6-dichlorogramine administered freshwater sample was 0.003. After 180 days, the $OD_{600}$ measurement for the *M. aeruginosa* freshwater sample administered with 5,6-dichlorogramine remained at 0.003. This test suggests that 5,6-dichlorogramine can be effective for at least 180 days. From these results, 5,6-dichlorogramine is effective in controlling the growth of *M. aeruginosa* in freshwater environments for at least 60 days after administration, at least 90 days after administration, at least 120 days after administration, and at least 180 days after administration.

In another experiment, an equal amount of *M. aeruginosa* was grown in each of two containers, each containing about 1 L of fresh water from an urban sink tap. One container was administered with about 0.05 mg/L of 5,6,7-trichlorogramine, and the control container was not administered with any compounds. After 15 days of *M. aeruginosa* growth, the $OD_{600}$ measurement for the unadministered *M. aeruginosa* freshwater sample was 0.119. The unadministered *M. aeruginosa* freshwater sample was discarded after 15 days. In contrast, after 15 days of *M. aeruginosa* growth, the $OD_{600}$ measurement for the 5,6,7-trichlrogramine administered freshwater sample was 0.003. After 180 days, the $OD_{600}$ measurement for the *M. aeruginosa* freshwater sample administered with 5,6,7-trichlorogramine remained at 0.003. This test suggests that 5,6,7-trichlrogramine can be effective for at least 180 days. From these results, 5,6,7-trichlorogramine is effective in controlling the growth of *M. aeruginosa* in freshwater environments for at least 60 days after administration, at least 90 days after administration, at least 120 days after administration, and at least 180 days after administration.

Since *M. aeruginosa* organisms do not live for 60 days, one application of either 5,6-dichlorogramine and 5,6,7-trichlorogramine at a concentration of 0.03 mg/L into a freshwater body is enough to inhibit the growth of the *M. aeruginosa* algae therein until their natural death.

D. Non-Toxicity of 5,6-Dichlorogramine and 5,6,7-Trichlorogramine to Non-Algae Plant and Animal Organisms The 5,6-dichlorogramine and 5,6,7-trichlorogramine compounds are ideal as *M. aeruginosa* toxic bloom algae growth inhibitors because both compounds are non-toxic to the rest of the freshwater environment. It is desirable to inhibit the growth of only the *M. aeruginosa* while being minimally harmful to the rest of the plant and animal organisms in the environment.

The effects of both compounds were tested on *Arabidopsis thaliana*, a small flowering plant that is widely used as an experimental model plant for laboratory studies. *A. thaliana* seeds were placed in petri dishes containing standard plant growth media with one gramine compound added (about 8 mg/L). For the control sample, the seeds were placed on the identical growth media without any gramine compound added. All petri dishes containing *A. thaliana* were kept in a lighted plant growth chamber at 22° C. with cycles of 16-hr light and 8-hr dark. Seed germination and seedling development were closely monitored and documented every 24 hours.

Figure 8A:
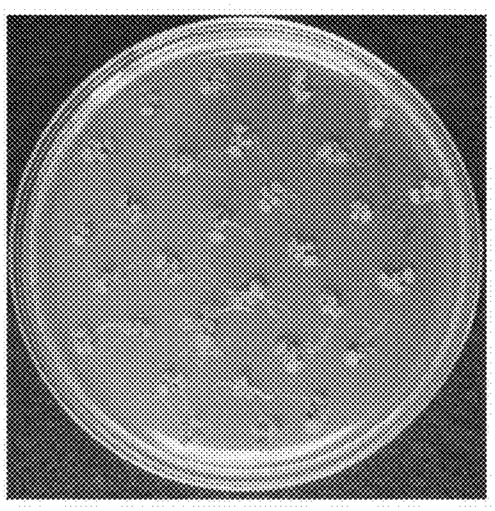
FIG. 8*a* shows an image of *A. thaliana* growing in a petri dish after administration of 0 mg/L 5,6-dichlorogramine.
Figure 8B:
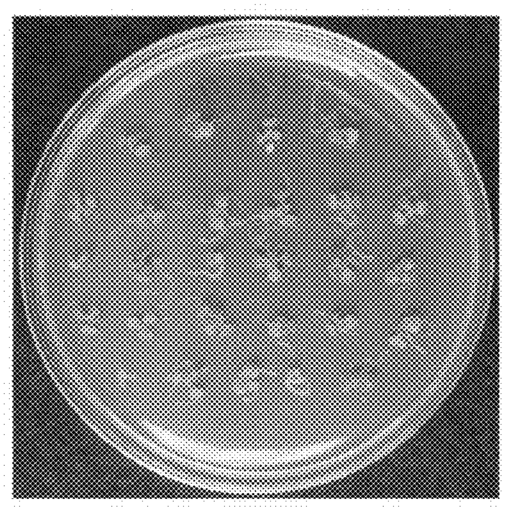
FIG. 8*b* shows an image of *A. thaliana* growing in a petri dish after administration of 8 mg/L 5,6-dichlorogramine.

FIGS. 8*a* and 8*b* show images of *A. thaliana* plants after 8 days of plant growth, or 8 days after germination. The *A. thaliana* plants were grown in petri dishes filled with Murashige and Skoog medium (MS plant growth medium containing both macronutrients, micronutrients, and vitamins) purchased from Sigma (Cat #M5519)). FIG. 8*a* shows a control dish with *A. thaliana* growing in a medium containing no gramine compound. FIG. 8*b* shows a petri dish containing *A. thaliana* growing in a medium containing 8 mg/L of 5,6-dichlorogramine. As shown in FIGS. 8*a* and 8*b*, no growth or developmental difference is exhibited between the *A. thaliana* plants growing in control medium and the plants growing in medium containing 8 mg/L 5,6-dichlorogramine. There is no evidence that 5,6-dichlorogramine is toxic to *A. thaliana* cells, even at the very high concentration of 8 mg/L.

Figure 9A:
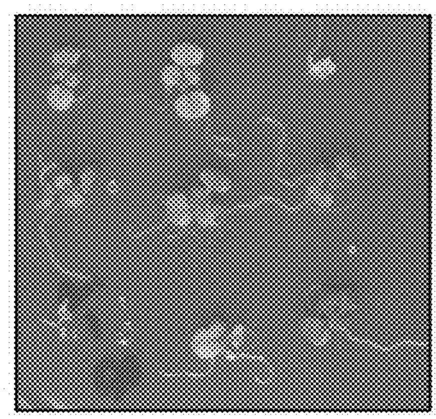
FIG. 9*a* shows an image of *A. thaliana* growing in a petri dish after administration of 0 mg/L 5,6,7-trichlorogramine.
Figure 9B:
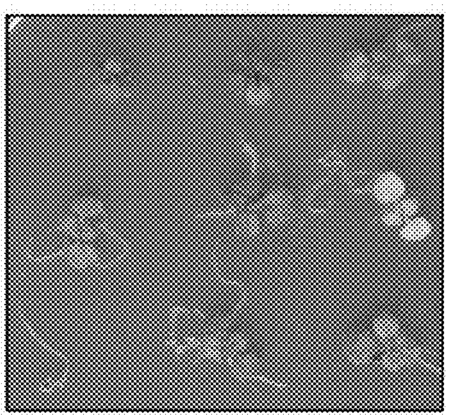
FIG. 9*b* shows an image of *A. thaliana* growing in a petri dish after administration of 8 mg/L 5,6,7-trichlorogramine.

FIGS. 9*a* and 9*b* show images of *A. thaliana* plants after 10 days of growth, or 10 days after germination. The *A. thaliana* plants were grown in petri dishes filled with Murashige and Skoog medium (MS plant growth medium containing both macronutrients, micronutrients, and vitamins) purchased from Sigma (Cat #M5519)). FIG. 9*a* shows a control dish with *A. thaliana* growing in a medium containing no gramine compound. FIG. 9*b* shows a petri dish containing *A. thaliana* growing in a medium containing 8 mg/L of 5,6,7-trichlorogramine. As shown in FIGS. 9*a* and 9*b*, no growth or developmental difference is exhibited between the *A. thaliana* plants growing in control medium and the plants growing in medium containing 8 mg/L 5,6,7-trichlorogramine. There is no evidence that 5,6,7-trichlorogramine is toxic to *A. thaliana* cells, even at the very high concentration of 8 mg/L.

The 5,6-dichlorogramine and 5,6,7-trichlorogramine compounds were also tested for toxicity to animal cells. The animal cells tested include human osteosarcoma cells from the U2OS cell line, which expresses p53 and Rb, but not p16. Also, cells tested in include human embryonic kidney 293T cells.

Figure 10A:
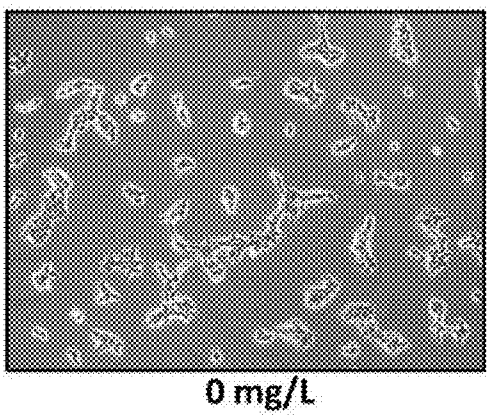
FIG. 10*a* shows an image of 293T cells growing in a petri dish after administration of 0 mg/L 5,6-dichlorogramine.
Figure 10B:
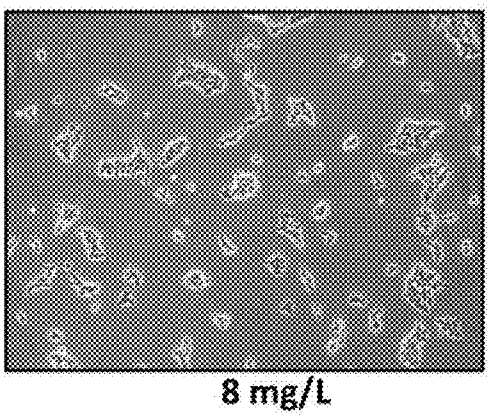
FIG. 10*b* shows an image of 293T cells growing in a petri dish after administration of 8 mg/L 5,6-dichlorogramine.

FIGS. 10*a* and 10*b* show the effects of 5,6-dichlorogramine on the growth of human embryonic kidney 293T cells. The 293T cells were grown in 10% Fetal Bovine Serum (FBS) added to Dulbeccos Modified Eagle Medium (DMEM) from Invitrogen (Cat #11964) with either no gramine compound or 8 mg/L 5,6-dichlorogramine. The cell culture flasks were kept in a $CO_2$ incubator at 37° C. temperature. Images were taken 2 days, or 48 hours, after the start of incubation. As shown in FIGS. 10*a* and 10*b*, no growth or developmental difference is exhibited between the human embryonic kidney 293T cells growing in the control culture and the cells growing in the medium containing 8 mg/L 5,6-dichlorogramine. There is no evidence that 5,6-dichlorogramine is toxic to human embryonic kidney 293T cells, even at the very high concentration of 8 mg/L.

Figure 11A:
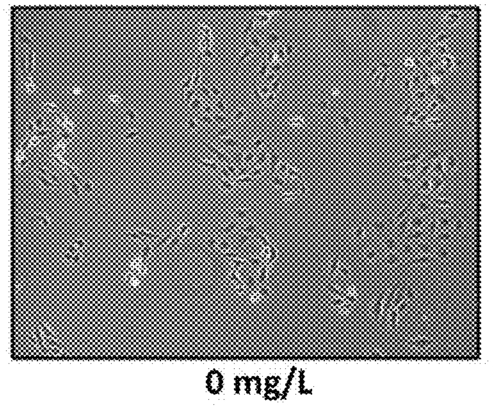
FIG. 11*a* shows an image of human osteosarcoma U2OS cells growing in a petri dish after administration of 0 mg/L 5,6-dichlorogramine.
Figure 11B:
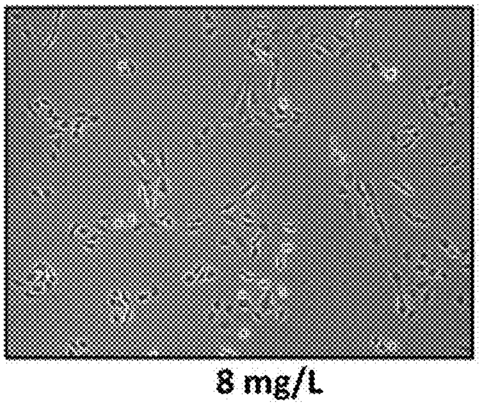
FIG. 11*b* shows an image of human osteosarcoma U2OS cells growing in a petri dish after administration of 8 mg/L 5,6-dichlorogramine.

FIGS. 11*a* and 11*b* show the effects of 5,6-dichlorogramine on the growth of U2OS cells. The cells were grown in 10% Fetal Bovine Serum (FBS) added to a McCoy's 5A medium from Invitrogen (Cat #16600) with either no gramine compound or 8 mg/L 5,6,-dichlorogramine. The cell culture flasks were kept in a $CO_2$ incubator at 37° C. temperature. Images were taken 2 days, or 48 hours, after the start of incubation. As shown in FIGS. 11*a* and 11*b*, no growth or developmental difference is exhibited between the U2OS cells growing in the control culture and the cells growing in the medium containing 8 mg/L 5,6,-trichlorogramine. There is no evidence that 5,6-dichlorogramine is toxic to U2OS cells, even at the very high concentration of 8 mg/L.

Figure 12A:
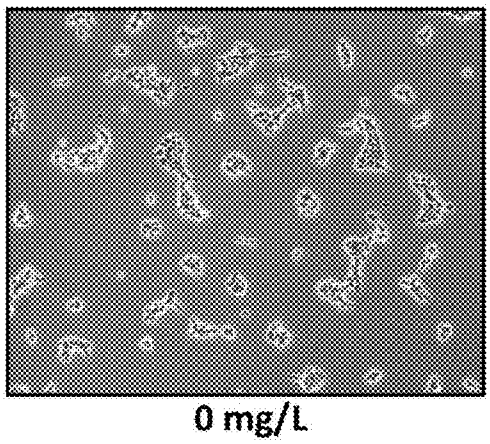
FIG. 12*a* shows an image of 293T cells growing in a petri dish after administration of 0 mg/L 5,6,7-trichlorogramine.
Figure 12B:
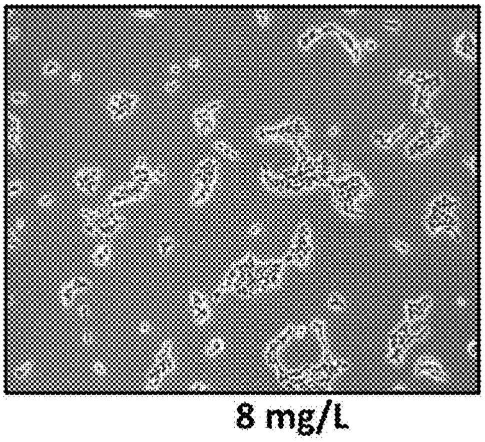
FIG. 12*b* shows an image of 293T cells growing in a petri dish after administration of 8 mg/L 5,6,7-trichlorogramine.

FIGS. 12*a* and 12*b* show the effects of 5,6,7-trichlorogramine on the growth of human embryonic kidney 293T cells. The 293T cells were grown in 10% Fetal Bovine Serum (FBS) added to Dulbeccos Modified Eagle Medium (DMEM) from Invitrogen (Cat #11964) with either no gramine compound or 8 mg/L 5,6,7-trichlorogramine. The cell culture flasks were kept in a $CO_2$ incubator at 37° C. temperature. Images were taken 2 days, or 48 hours, after the start of incubation. As shown in FIGS. 12*a* and 12*b*, no growth or developmental difference is exhibited between the human embryonic kidney 293T cells growing in the control culture and the cells growing in the medium containing 8 mg/L 5,6,7-trichlorogramine. There is no evidence that 5,6,7-trichlorogramine is toxic to human embryonic kidney 293T cells, even at the very high concentration of 8 mg/L.

Figure 13A:
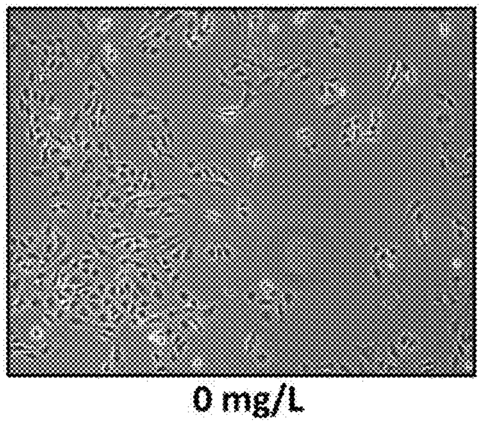
FIG. 13*a* shows an image of human osteosarcoma U2OS cells growing in a petri dish after administration of 0 mg/L 5,6,7-trichlorogramine.
Figure 13B:
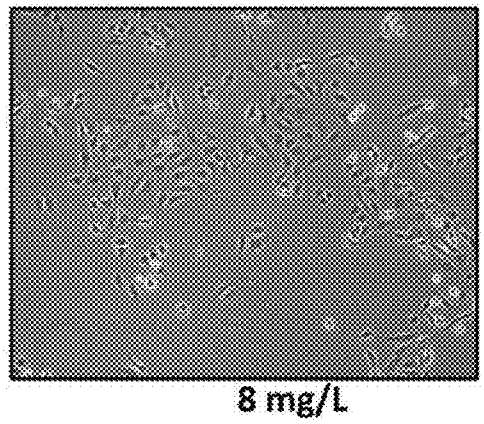
FIG. 13*b* shows an image of human osteosarcoma U2OS cells growing in a petri dish after administration of 8 mg/L 5,6,7-trichlorogramine.

FIGS. 13*a* and 13*b* show the effects of 5,6,7-trichlorogramine on the growth of U2OS cells. The cells were grown in 10% Fetal Bovine Serum (FBS) added to a McCoy's 5A medium from Invitrogen (Cat #16600) with either no gramine compound or 8 mg/L 5,6,7-trichlorogramine. Images were taken 2 days, or 48 hours, after the start of incubation. As shown in FIGS. 13*a* and 13*b*, no growth or developmental difference is exhibited between the U2OS cells growing in the control culture and the cells growing in the medium containing 8 mg/L 5,6,7-trichlorogramine. There is no evidence that 5,6,7-trichlorogramine is toxic to U2OS cells, even at the very high concentration of 8 mg/L.

The 5,6-dichlorogramine and 5,6,7-trichlorogramine compounds are very potent against *M. aeruginosa*, effectively inhibiting the toxic bloom algae resulting therefrom at the very low concentration of 0.03 mg/L. Those same compounds are virtually harmless to plant and animal cells, having no visible effect on them at very high concentrations. While both 5,6-dichlorogramine and 5,6,7-trichlorogramine are algaestatic agents that inhibit growth, they are not poisons that harm plants or animal cells.

The 5,6-dichlorogramine and 5,6,7-trichlorogramine compounds can be used alone or in combination with each other. The 5,6-dichlorogramine and 5,6,7-trichlorogramine compounds also can each be used in combination with other non-gramine compounds to control toxic bloom algae.

A number of embodiments of the invention have been described. Nevertheless, it will be understood that various modifications may be made without departing from the spirit and scope of the invention. Accordingly, other embodiments are within the scope of the present invention.

What is claimed is:

1. A method of inhibiting the growth of cyanobacteria *Mycrocystis aeruginosa* in freshwater comprising administering an effective amount of 5,6-dichlorogramine to said freshwater.

2. A method according to claim 1, wherein said effective amount comprises a 5,6-dichlorogramine concentration of between about 0.01 mg/L and about 0.05 mg/L in said freshwater.

3. A method according to claim 1, wherein said effective amount comprises a 5,6-dichlorogramine concentration of about 0.03 mg/L in said freshwater.

4. A method according to claim 1, wherein said administering step comprises adding about 3 grams of said 5,6-dichlorogramine to about 100,000 L of said freshwater.

5. A method according to claim 1, wherein said administering step comprises:

creating a solution having a concentration of about 1 g/L by dissolving about 3 g of said 5,6-dichlorogramine in about 3 L of water; and adding said solution to about 100,000 L of said freshwater.

6. A method according to claim 1, wherein said administering step occurs not more than once every 60 days.

7. A method according to claim 1, wherein said administering step occurs not more than once every 90 days.

8. A method according to claim 1, wherein said administering step occurs not more than once every 120 days.

9. A method according to claim 1, wherein said administering step occurs not more than once every 180 days.

10. A method according to claim 1, wherein said administering step comprises:

creating a solution having a concentration of about 1 g/L by dissolving about 3 g of said 5,6,-dichlorogramine in about 3 L of water; and adding said solution to about 100,000 L of said freshwater not more than once every 60 days.

11. A method of inhibiting the growth of cyanobacteria *Mycrocystis aeruginosa* in freshwater comprising administering an effective amount of 5,6,7-trichlorogramine to said freshwater.

12. A method according to claim 11, wherein said effective amount comprises a 5,6,7-trichlorogramine concentration between about 0.01 mg/L and about 0.05 mg/L in said freshwater.

13. A method according to claim 11, wherein said effective amount comprises a 5,6,7-trichlorogramine concentration of about 0.03 mg/L in said freshwater.

14. A method according to claim 11, wherein said administering step comprises adding about 3 grams of said 5,6,7-trichlorogramine to about 100,000 L of said freshwater.

15. A method according to claim 11, wherein said administering step comprises:

creating a solution having a concentration of about 1 g/L by dissolving about 3 g of said 5,6,7-trichlorogramine in about 3 L of water; and adding said solution to about 100,000 L of said freshwater.

16. A method according to claim 11, wherein said administering step occurs not more than once every 60 days.

17. A method according to claim 11, wherein said administering step occurs not more than once every 90 days.

18. A method according to claim 11, wherein said administering step occurs not more than once every 120 days.

19. A method according to claim 1, wherein said administering step occurs not more than once every 180 days.

20. A method according to claim 11, wherein said administering step comprises:

creating a solution having a concentration of about 1 g/L by dissolving about 3 g of said 5,6,7-trichlorogramine in about 3 L of water; and adding said solution to about 100,000 L of said freshwater not more than once every sixty days.

21. A method of inhibiting the growth of cyanobacteria *Mycrocystis aeruginosa* in freshwater comprising administering an effective amount of a combination of 5,6-dichlorogramine and 5,6,7-trichlorogramine to said freshwater.

* * * * *